United States Patent
Bamrungtham

(10) Patent No.: US 7,863,889 B1
(45) Date of Patent: Jan. 4, 2011

(54) COMPONENT RECEPTACLE TO SEGREGATE COMPONENTS

(75) Inventor: Ritthirong Bamrungtham, Kookod Lumlookka (TH)

(73) Assignee: Western Digital Technologies, Inc., Lake Forest, CA (US)

(*) Notice: Subject to any disclaimer, the term of this patent is extended or adjusted under 35 U.S.C. 154(b) by 909 days.

(21) Appl. No.: 11/703,001

(22) Filed: Feb. 6, 2007

(51) Int. Cl.
*G01R 31/00* (2006.01)

(52) U.S. Cl. .................................. 324/158.1

(58) Field of Classification Search ............... 324/158.1, 324/210, 212, 765; 209/567–575, 549, 702, 209/942

See application file for complete search history.

(56) References Cited

U.S. PATENT DOCUMENTS

| | | | |
|---|---|---|---|
| 3,198,330 A * | 8/1965 | Wiesler et al. ............. 209/573 |
| 3,677,401 A * | 7/1972 | Chaparro et al. ............. 209/3.1 |
| 3,969,229 A * | 7/1976 | Horner ........................ 209/573 |
| 4,695,707 A * | 9/1987 | Young ......................... 219/392 |
| 4,765,488 A * | 8/1988 | Moriarity ..................... 209/551 |
| 5,307,011 A | 4/1994 | Tani |
| 5,543,727 A * | 8/1996 | Bushard et al. ............. 324/760 |
| 5,794,789 A * | 8/1998 | Payson et al. ................ 209/549 |
| 6,222,145 B1 * | 4/2001 | Cook et al. .................. 209/573 |
| 6,239,396 B1 | 5/2001 | Kang |
| 6,259,964 B1 * | 7/2001 | Robinson ..................... 700/224 |
| 6,300,584 B1 | 10/2001 | Song |
| 6,370,446 B1 * | 4/2002 | Divine ......................... 700/226 |
| 6,433,294 B1 | 8/2002 | Nemoto et al. |
| 6,467,153 B2 | 10/2002 | Butts et al. |
| 6,895,306 B2 | 5/2005 | Ebisawa et al. |
| 7,049,809 B2 | 5/2006 | Luo et al. |
| 7,196,508 B2 * | 3/2007 | Ham et al. ............... 324/158.1 |
| 7,528,617 B2 * | 5/2009 | Cojocneanu et al. ........ 324/754 |
| 2004/0104722 A1 | 6/2004 | Kainuma et al. |

* cited by examiner

*Primary Examiner*—Paresh Patel

(57) ABSTRACT

A component receptacle for coupling to a component tester that tests a component is disclosed. The component receptacle includes a plurality of trays mounted in a housing for receiving components, a tray access control system configured to control access to at least one of the plurality of trays, and circuitry configured to perform operations. In particular, the operations include: processing a component test result for a component to match the component with the at least one tray, and causing the tray access control system to enable access to the at least one tray.

30 Claims, 7 Drawing Sheets

COMPONENT RECEPTACLE TO SEGREGATE COMPONENTS

BACKGROUND

1. Field of the Invention

The present invention relates to a component receptacle to segregate components.

2. Description of the Prior Art and Related Information

A component is typically defined as an element of a larger system. Computers, hardware, disk drives, cell-phones, etc., or for that matter any type of electronic, mechanical, or electromechanical system rely upon a multitude of individual electronic, mechanical, and/or electromechanical components to operate properly. If just one component is faulty or does not meet pre-defined performance specifications, then the larger system into which the component is assembled may be inoperative or may not meet performance requirements.

Therefore, individual electronic, mechanical, or electromechanical components are typically individually tested to ensure that they meet performance criteria before they are assembled into larger systems.

One commonly employed method of accomplishing this testing is by having an operator place the particular type of electronic, mechanical, or electromechanical component into a corresponding tester for testing. The tester will perform a pre-determined test or series of tests upon the component and will display the result of the test (e.g. pass or fail) upon a display screen to the operator. It is then up to the human operator to take the component out of the tester and to place the tested component into some sort of collection device based upon the test result (e.g. pass or fail) previously displayed to the operator. By performing such segregation, components that have successfully passed testing are available for assembly into their larger designated systems, whereas components that have failed their testing are typically discarded or repaired.

A variety of different types of similar components may often be tested at the same time. Therefore, there are typically a variety of different types of components having different types of test outcomes (e.g. pass or fail) which need to be placed by the human operator into different collection devices corresponding to the type of component and test outcome.

As a result, there is a chance for human error, possibly resulting in the wrong type of component or a component with an incorrect pass or fail rating being segregated into the wrong collection device. Unfortunately, when the wrong type of component or a failing component is assembled into a larger electronic, mechanical, or electromechanical system, the system may be completely inoperative or may not operate in accordance with performance requirements. These types of errors may add cost to the production of electronic, mechanical, and electromechanical systems.

SUMMARY

The present invention relates to a component receptacle to segregate components.

In one embodiment of the present invention, a component receptacle for coupling to a component tester that tests a component is disclosed. The component receptacle includes a plurality of trays mounted in a housing for receiving components, a tray access control system configured to control access to at least one of the plurality of trays, and circuitry configured to perform operations. In particular, the operations include: processing a component test result for a component to match the component with the at least one tray, and causing the tray access control system to enable access to the at least one tray.

In another embodiment of the present invention, a method of manufacturing a device, including at least one component tested at a component tester, is disclosed. The component tester is coupled to a component receptacle having a plurality of trays for receiving components and is configured to transmit a component test result for a component to the component receptacle. The method includes operations comprising: processing the component test result received from the component tester for the component to match the component with at least one of the plurality of trays, and enabling access to the at least one tray.

In yet another embodiment of the present invention, a system to segregate components is disclosed. The system includes a component tester to test a component and a component receptacle coupled to the component tester. The component receptacle includes a plurality of trays mounted in a housing for receiving components, a tray access control system configured to control access to at least one of the plurality of trays, and circuitry configured to perform operations. These operations include: processing a component test result for the component to match the component with the at least one tray, and causing the tray access control system to enable access to the at least one tray.

The foregoing and other features of the invention are described in detail below and are set forth in the appended claims.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
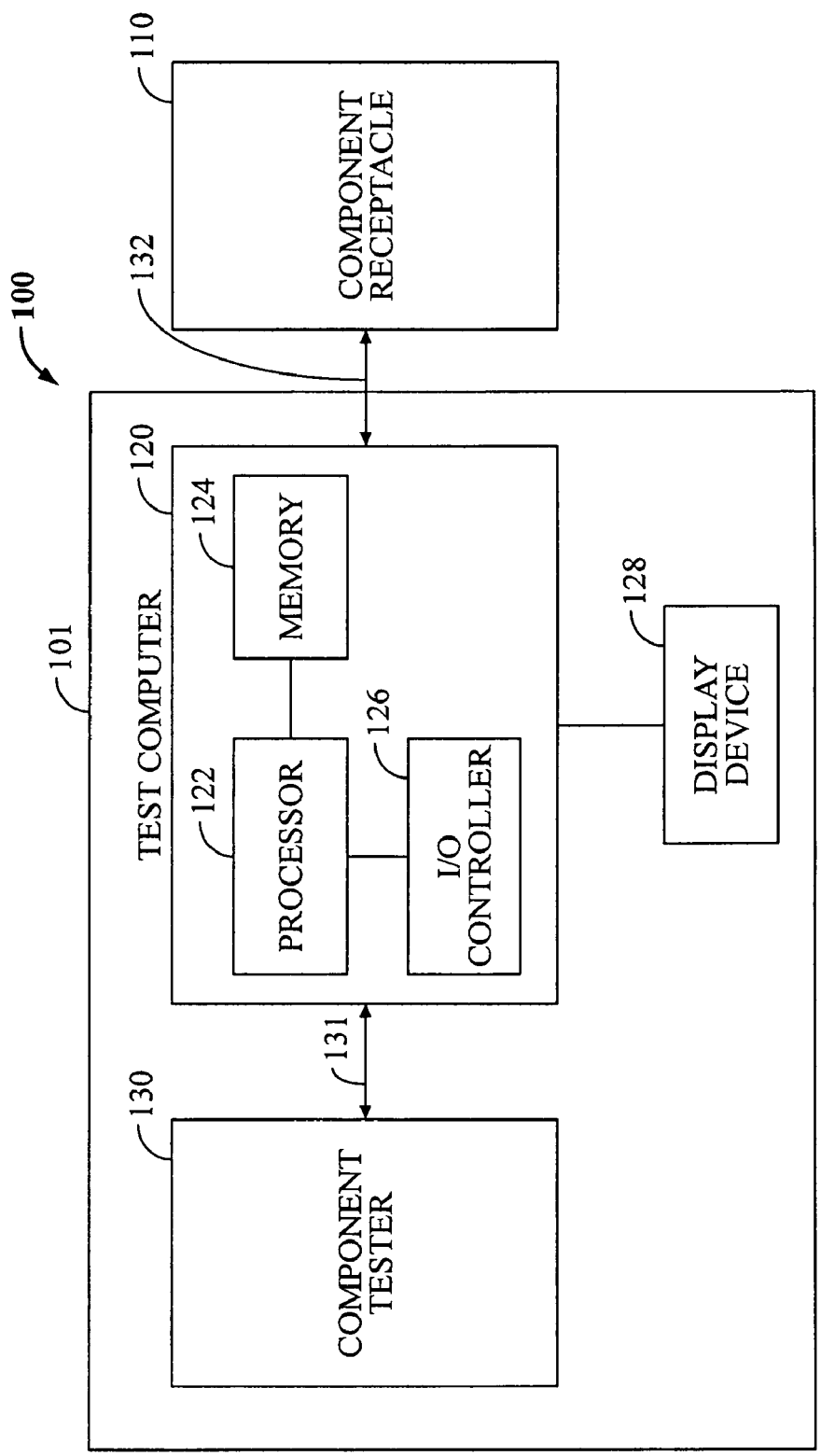
FIG. 1 is a block diagram of a system to segregate components, according to one embodiment of the present invention.

With reference now to FIG. 1, FIG. 1 is a block diagram of a system 100 to segregate components, according to one embodiment of the present invention. Particularly, system 100 may include a component receptacle 110, a test computer 120, and a component tester 130.

As will be described in more detail later, component receptacle 110 may include a plurality of trays mounted in a housing for receiving components and a tray access control system configured to control access to the plurality of trays. More specifically, component receptacle 110 processes a component test result for a component to match the component with a particular tray, and causes the tray access control system to enable access to the particular tray to allow an operator to place the tested component in the particular tray. In one embodiment, processing the component test result may include determining a component characteristic that is utilized to match the component with the particular tray.

Test computer 120 may be coupled between component tester 130 and component receptacle 110. In one embodiment, test computer 120 and component tester 130 are part of an integrated system 101. In another embodiment, test computer 120 and component tester 130 are not part of integrated system but are separate components that may be coupled to one another through a suitable interface and protocol. In either configuration, component tester 130 performs a test upon a component and transmits the component test result to test computer 120 via link 131. Link 131 may be any suitable wired or wireless communication link. Test computer 120 may process the component test result and visually display the component test result on a display device 128. Further, test computer 120 may forward the component test result to component receptacle 110, again via a suitable wired or wireless communication link 132, such as a Universal Serial Bus (USB) link. The component test result forwarded to the component receptacle 110 may or may not be identical to the result originally transmitted from the component tester 130 to the test computer 120. In one embodiment, the test computer 120 may simply forward the same result, while in other embodiments, the test computer may process the component test result before forwarding it on to the component receptacle 110.

It should be appreciated that test computer 120 may be any type of computing device, such as a personal computer (PC) running, for example, a MICROSOFT operating system, such as a WINDOWS type operation system. Test computer 120 may include a suitable processor 122, memory 124, and a suitable input/output (I/O) controller 126 to implement the above functionality. Also, in one embodiment, component receptacle 110 may comprise a processor, memory, and a display device to implement the functionality provided by the test computer 120, when test computer 120 is omitted.

In one particular example, integrated system 101 is an integrated head gimbal assembly (HGA) testing system 101 including an HGA component tester 130 and a test computer 120 to test HGA disk drive components. For example, in the HGA embodiment, the HGA component testing system 101 may be manufactured by GUZIK TECHNICAL ENTERPRISES; although many other types of HGA testing systems manufactured by different companies may be utilized. In this example, the component test result is indicative of an HGA characteristic that includes at least one of a type of HGA and a pass/fail rating. Types of HGAs may be designated by such features as HGA size, HGA brand, or HGA features such as whether the HGA includes a perpendicular or longitudinal magnetic recording head.

However, it should be appreciated that system 101 may test any sort of electronic, mechanical, or electromechanical component and that component tester 130 may be any type of electronic, mechanical, or electromechanical component tester. Suitable test results of all sorts may be forwarded on to test computer 120 and/or component receptacle 110. In many embodiments, the test results may, for example, rate certain qualities of the electronic, mechanical or electromechanical component, thereby grading the components for different uses. The HGA system and the pass/fail rating system represent just one example of a system, component tester and test results.

Figure 2:
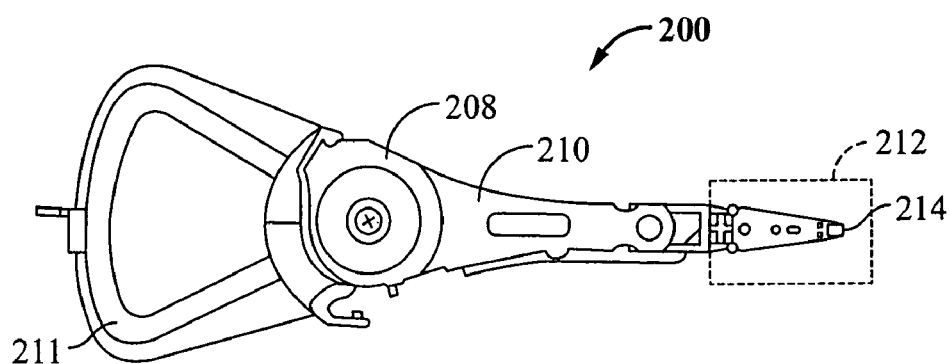
FIG. 2 is a diagram of a head gimbal assembly (HGA) component attached to an actuator arm of a rotary actuator assembly commonly used in hard disk drive assemblies.

Turning briefly to FIG. 2, FIG. 2 illustrates an example of a head gimbal assembly (HGA) component 212 attached to an actuator arm 210 of a rotary actuator assembly 200 commonly used in hard disk drive assemblies. As is known, for background information, the rotary actuator assembly 200 typically includes a body portion 208, at least one actuator arm 210 cantilevered from the body portion 208, and a coil portion 211 cantilevered from the body portion 208 in an opposite direction from the actuator arm 210. The actuator arm 210 supports HGA 212. HGA 212 includes and supports a slider or magnetic read/write head 214. It should be appreciated that HGA components and HGA component testers are well known in the art.

Figure 3A:
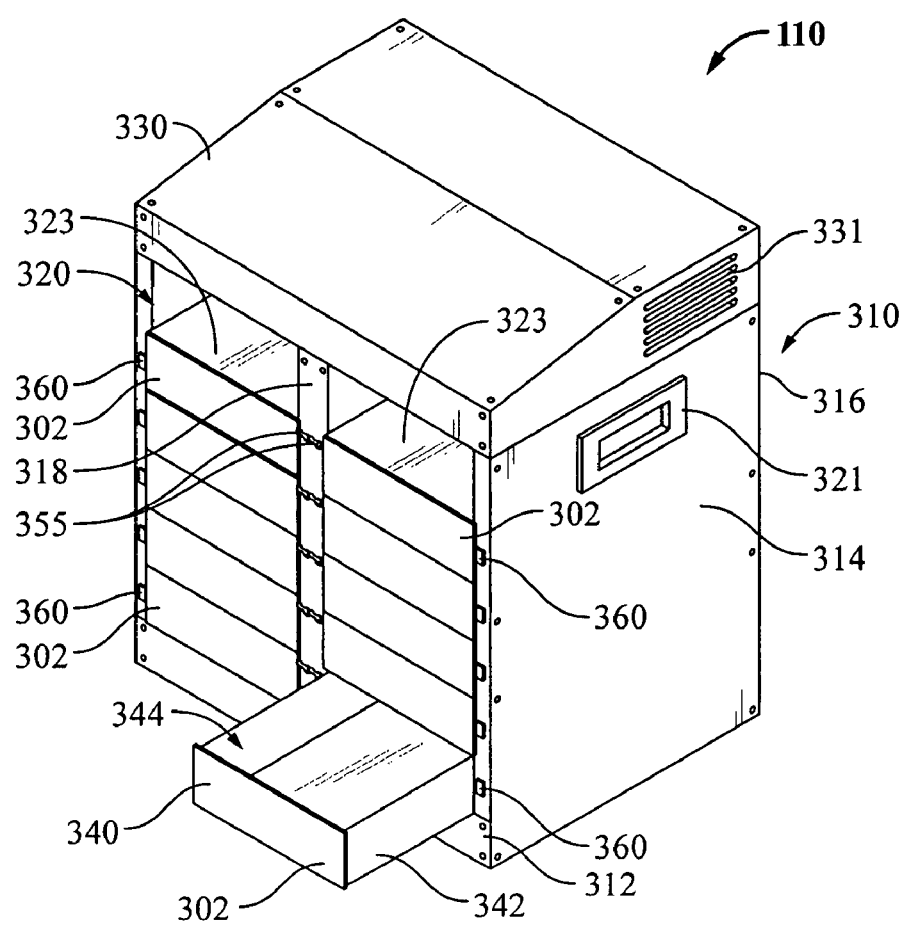
FIG. 3A is a perspective view of a component receptacle, according to one embodiment of the present invention.

With reference to FIG. 3A, a perspective view of a component receptacle 110 is shown, according to one embodiment of the present invention. As can be seen in FIG. 3A, component receptacle 110 includes a plurality of trays 302. Each of these trays 302 may be utilized for receiving and storing a component from the component tester. Further, as will be described, component receptacle 110 includes a tray access control system that is configured to control access to each of the plurality of trays 302.

Additionally, as will be described in more detail later, component receptacle 110 includes circuitry that is configured to process a component test result for a component to match the component with a specific tray 302, and cause the tray access control system to enable access for an operator to the specific tray 302. In one embodiment, processing the component test result may include determining a component characteristic that is utilized to match the component with the specific tray. In some embodiments, this specific tray 302 may be pre-designated to store particular types of components. For example, in one embodiment, the type of component that is to be tested may be an HGA component, as previously described. In this embodiment, the component test result may be indicative of an HGA characteristic that includes a type of HGA that has been tested and whether the HGA has passed or failed the test at the component tester. HGA types may be based upon a size of an HGA, an HGA brand, and/or a feature of an HGA (e.g. a standard HGA with longitudinal recording head or an adjustable fly-height HGA with a perpendicular recording head).

Figure 4:
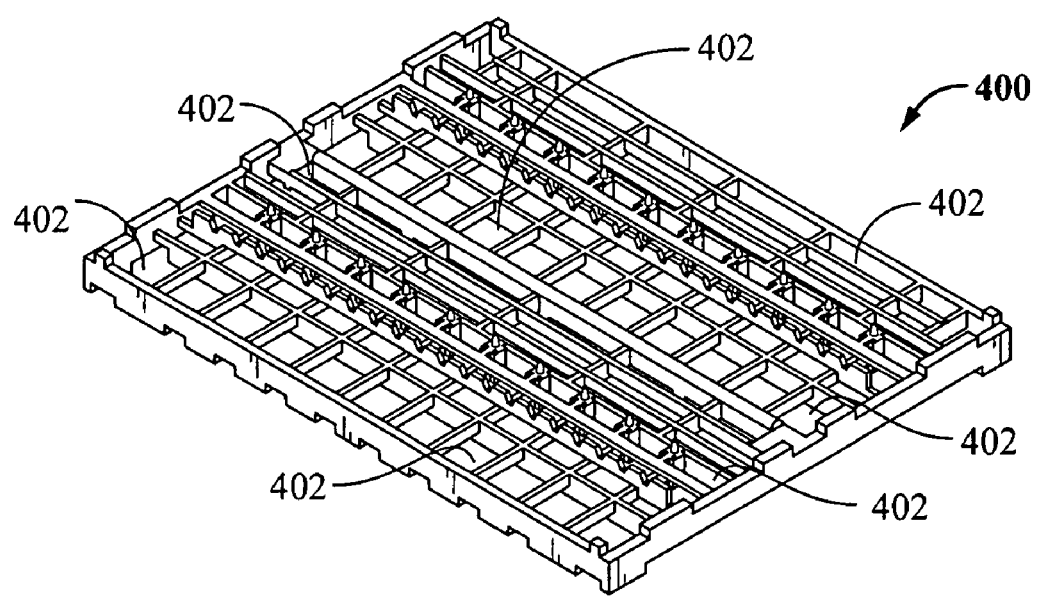
FIG. 4 is a perspective view of a storage plate for storing HGA components.

Continuing with this HGA example, with brief reference to FIG. 4, a perspective view of one embodiment of a storage plate 400 for storing HGAs is shown. Storage plate 400 is generally rectangularly-shaped and includes a plurality of receiving recesses 402 for receiving and storing HGAs that have been tested. As can be seen in FIG. 4, differently-sized recesses may be present for storing differing types of HGAs. A plurality of HGA storage plates 400 may be stacked upon one another within a tray 302 of component receptacle 110 in order to store a large quantity of HGAs.

However, it should be appreciated that this is just one type of example of a storage plate or container that may be used for storing components suitable for use with a tray 302 of component receptacle 300. It should be appreciated that any sort of suitable storage plate, container, tray, receptacle, etc. for receiving and storing any type of component may be utilized for storage within a tray 302 of component receptacle 110.

Looking back to component receptacle 110 of FIG. 3A, component receptacle 110 may include a generally-rectangularly shaped housing 310 having a base 312, a pair of opposed side walls 314 (only one shown), a back wall 316 (not shown), a dividing wall 318 parallel to the opposed side walls 314, and an open front face 320. The plurality of trays 302 may be slidably mounted in housing 310 between side walls 314 and dividing wall 318, respectively, and are slidable in and out of the open front face 320, as will be described. Recessed handles 321 (only one shown) for moving component receptacle 110 may be provided.

Additionally, housing 310 may include a suitable top cover 330 mounted on top of side walls 314 and back wall 316 of component receptacle 110. In one embodiment, the electronics of the component receptacle (which will be described later in more detail) may be housed in the upper portion of the component receptacle and are covered by top cover 330. Vent grates 331 (only one set shown) may also be disposed in sides of cover 330 for providing ventilation to the electronics. Further, as can be seen in FIG. 3A, a separation plate 323 may be mounted above each of the uppermost trays 302 between the sidewalls 314 and dividing wall 318, defining an open space between the uppermost trays and top cover 330.

It should be appreciated that housing 310 of component receptacle 110 may be produced from suitable materials such as metallic materials, plastic materials, metallic-plastic materials, etc., and the various components including base 312, side walls 314, back wall 316, dividing wall 318, cover 330 may be secured together by conventional framing structures and fasteners such as, screws, nuts, bolts, rivets, welding, glue, etc.

Figure 3B:
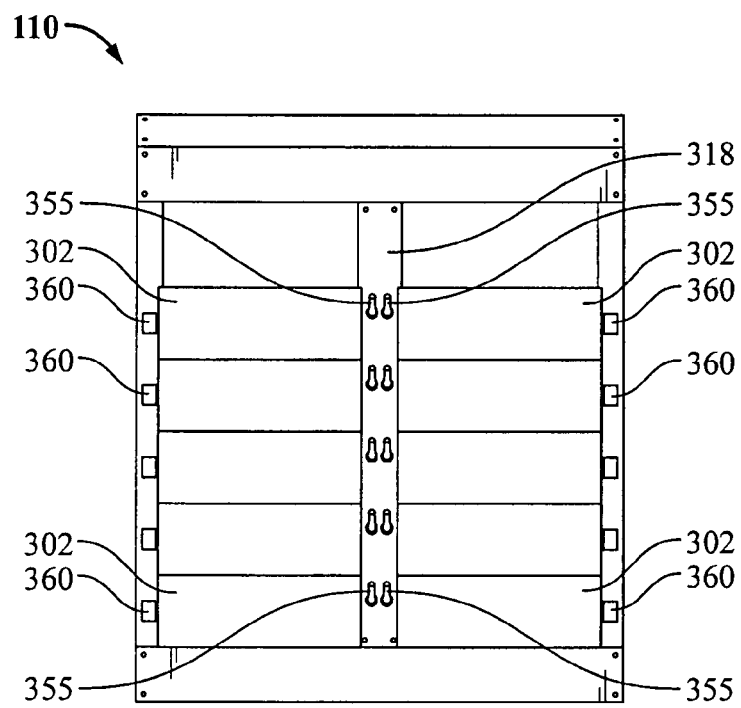
FIG. 3B is a front view of the component receptacle of FIG. 3A, according to one embodiment of the present invention.

With reference also to FIG. 3B, which is a front view of the component receptacle 100, movement of trays 302 and visual indication features of component receptacle 100 will now be described.

Each of the plurality of trays 302 may be slidably mounted into housing 310 between sidewalls 314 and dividing wall 318, respectively, for movement between open and closed positions, (as shown in FIG. 3A) out of and into housing 310, respectively. The bottom-right tray 302 is shown in the open position whereas the other trays 302 are shown in the closed position.

As will be described in more detail later, the tray access control system of component receptacle 110 may be configured to automatically move a particular tray 302 to the open position out of housing 310 allowing access to the tray by an operator such that the operator can place a tested component from the component tester into the tray, and then after a pre-defined period of time, to automatically move the particular tray to a closed position back into the housing, to prevent access to the tray. In this way, the component receptacle 110 can be used to automatically segregate and collect tested components from the component tester in such a fashion that the correct type of component with the correct type test rating is placed into the correct tray thereby virtually eliminating operating error in segregating components.

In another embodiment, the tray access control system of component receptacle 110 may be otherwise configured to enable access to the trays. For example, the tray access control system may be configured to lock all of the trays by default, and then automatically unlock a particular tray 302, enabling access to the tray such that the operator can place a tested component from the component tester into the tray. Then, when the tray is closed, the tray access control system may then again lock all of the trays, thereby preventing access to them.

Looking particularly at the example opened tray in FIG. 3A, each of the trays 302 may be generally rectangularly-shaped having a front face 340, side walls 342, a closed back end (not shown) and an open top portion 344 for receiving individual components and/or containers for storing multiple components. For example, a storage plate 400 for storing components (e.g. HGAs), as previously described, may be inserted within tray 302.

Additionally, each tray 302 may be suitably slideably mounted in the housing for movement between open and closed positions, out from and into housing 310, under the control of the tray access control system utilizing solenoid drivers, as will be described. In this respect, each tray 302 may be conventionally slideably mounted within the housing 310 by, for example, complementary rails and guides, rotational devices such as ball-bearings and wheels, guided rail mechanisms with slideable features such as ball-bearings or wheels, free-mounting within the housing, or other suitable slideable mechanisms for the movement of trays out from and into a housing, as is well known to those skilled in the art.

Further, with respect to the movement of trays, each tray 302 has an associated manual toggle switch 355 mounted next to the tray on dividing wall 318. Selection of the manual toggle switch 355 by an operator commands the tray access control system to move the associated tray to an open or closed position based upon the switch position thereby allowing the operator to manually open and close the tray, as will be described in more detail later.

In some embodiments, each tray 302 may have an associated visual indicator 360. In one embodiment, visual indicator 360 may be a light emitting diode (LED) device. However, it should be appreciated that a wide variety of visual indicators may be utilized such as other photo-emitting devices, light bulbs, flash devices, as well as audible devices alone or in conjunction with visual indicators.

In particular, visual indicator 360 may be utilized to provide a visual indication at a pre-determined time before the associated tray 302 is moved to the open position to indicate to the operator that the tray 302 is about to be opened thereby providing a safety feature for the operator. For example, a visual indicator 360 associated with a corresponding tray 302 may emit a pre-determined number of flashes to indicate to the operator that the tray 302 is about to open.

Similarly, a visual indicator 360 associated with a corresponding tray 302 may provide a visual indication, such as a pre-determined number of flashes, at a pre-determined time before the corresponding tray 302 is about to be moved to the closed position, to indicate to the operator that the tested component should have been placed in the corresponding tray 302 by this time or should be placed in the corresponding tray 302 immediately. This also provides a safety feature to the operator to indicate that the tray 302 is about to be closed. In other embodiments, the visual indicator 360 may be the mechanism by which the operator knows which tray has been unlocked, so that the operator may access that tray to place the component.

Also, although component receptacle 110 is shown as having 10 trays including two columns of five trays separated by a dividing wall 318, it should be appreciated that component receptacle 110 may include any suitable number of trays with suitable configurations dependent upon design considerations.

Figure 3C:
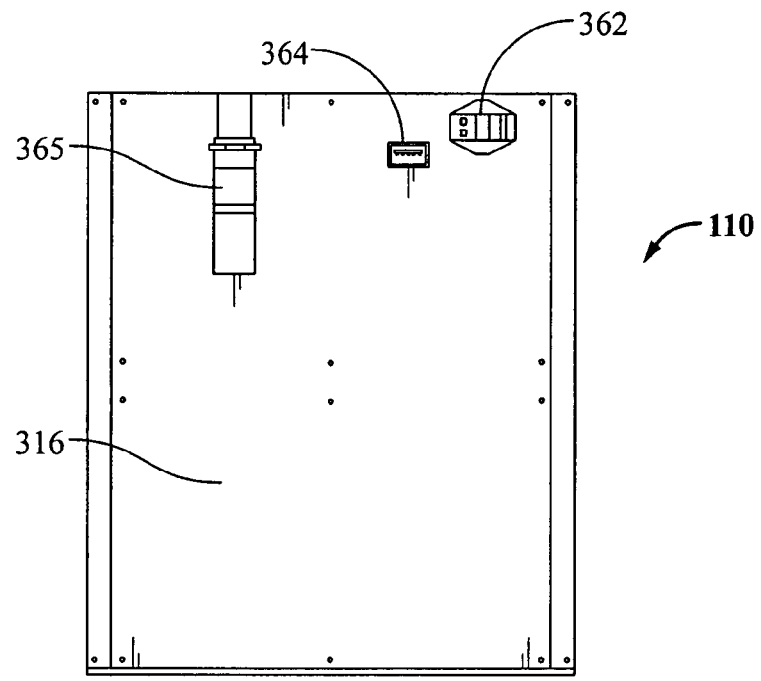
FIG. 3C is a back view of the component receptacle of FIG. 3A, according to one embodiment of the present invention.

Looking briefly at FIG. 3C, a back view of the component receptacle 110 is shown. Particularly, as can be seen in FIG. 3C, back wall 316 of the component receptacle 300 includes an on/off power switch 362, a connector port 364 (e.g. a USB connector port) to connect component receptacle 110 to test computer 120 by a suitable connector cable, and a power regulator 365 to receive power for component receptacle 110. In one embodiment component receptacle 110 may accept an input voltage of 220 VAC.

Figure 5:
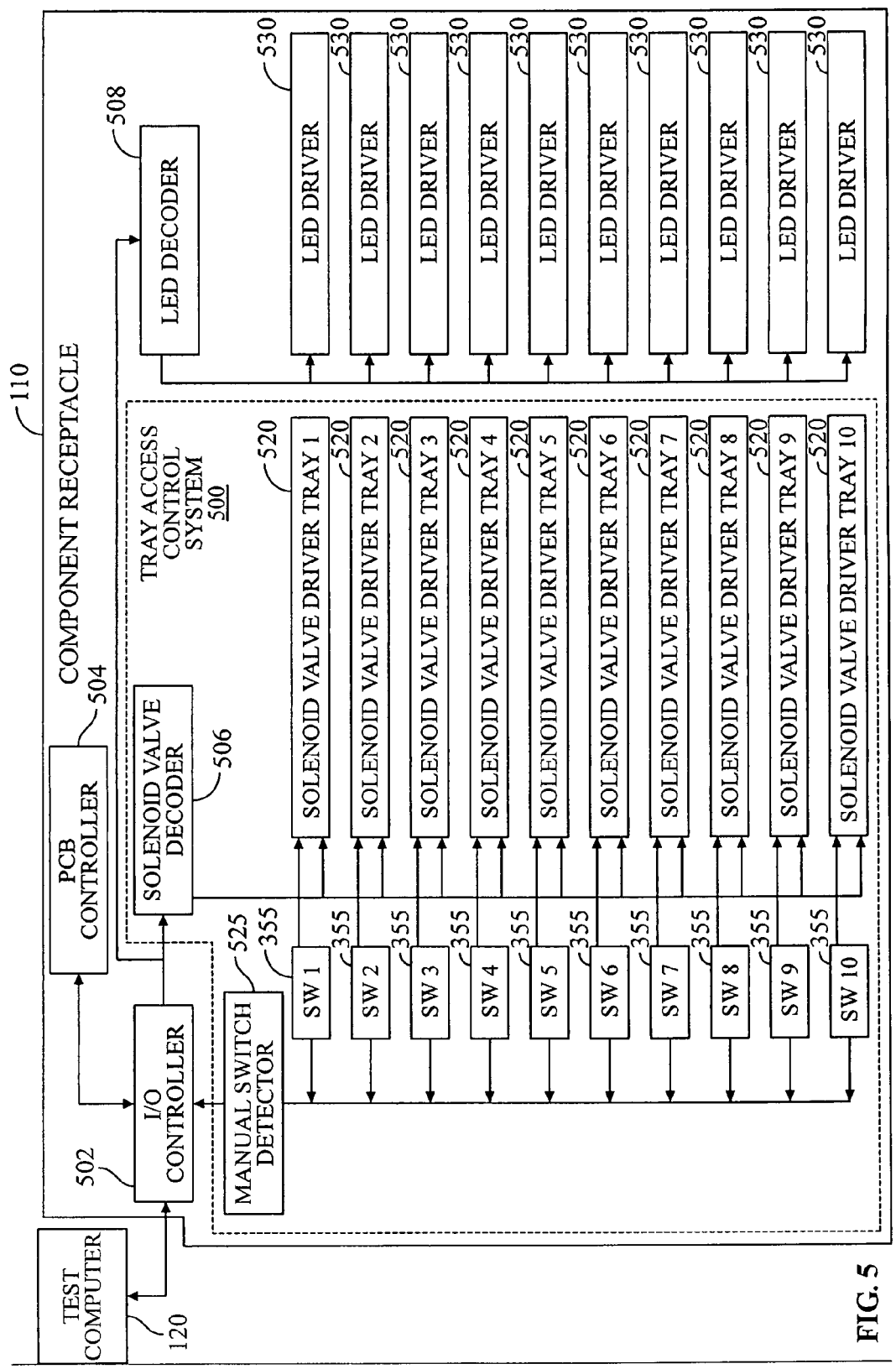
FIG. 5 is a block diagram illustrating electronic components of the component receptacle, and particularly illustrates a tray access control system, according to one embodiment of the present invention.

Turning now to FIG. 5, FIG. 5 is a block diagram illustrating some example electronic components of component receptacle 110 and particularly illustrates a tray access control system 500. As can be seen in FIG. 5, test computer 120 may be connected through a connector port of the component receptacle (e.g. through USB port 364 previously described) to an input/output (I/O) controller 502. I/O controller 502 is further coupled to printed circuit board (PCB) controller 504, solenoid valve decoder 506, and LED decoder 508.

PCB controller 504 under the control of a program or routine may be utilized to control the performance of operations of the component receptacle 110 including: processing a component test result for a tested component received from test computer 120 to match the component with a corresponding tray 302, and causing the tray access control system 500 to enable access to the corresponding tray to the operator. In one embodiment, processing the component test result may include determining a component characteristic that is utilized to match the component with the corresponding tray 302.

It should be appreciated that processing the component test result generally refers to the PCB controller 504 of component receptacle 110 under the control of a program or routine utilizing component test result data received from the test computer 120 as a basis for selecting a matching tray as part of a functional operation. In one embodiment, component test result data may only include a simple pass/fail rating for the tested component. In other embodiments, the component test result data may, in addition to the pass/fail rating for the component, include a characteristic associated with the component being tested. Characteristics may refer to quantitative electrical, magnetic, mechanical, etc., attributes associated with the component. Based upon this processed component test result data, the component receptacle 110 matches a component with a corresponding tray 302. In some embodiments, trays 302 are pre-designated to store particular types of components based upon the pass/fail rating and/or characteristics of the component.

For example, as previously described, in one embodiment, a type of component that may be tested is an HGA component. In this embodiment, the component test result may be indicative of an HGA characteristic that includes a type of HGA that has been tested and whether the HGA has passed or failed the test at the component tester. HGA types may be based upon a size of an HGA, an HGA brand, and/or a feature of an HGA (e.g. a standard HGA with longitudinal recording head or an adjustable fly-height HGA with a perpendicular recording head).

More specifically, PCB controller 504 may control tray access control system 500 through I/O controller 502. In particular, the PCB controller 504 after matching a tested component with a corresponding tray 302 may command the tray access control system 500 to open the corresponding tray 302 to allow an operator to place the tested component within the tray 302 and to then close the tray 302 after a pre-determined period of time.

For the purposes of the present specification, it should be appreciated that the terms "controller", "processor", and "microprocessor", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc. Moreover, the PCB controller and I/O controller may be in any suitable configuration.

Looking particularly at tray access control system 500, in one embodiment, tray access control system 500 may include a solenoid valve decoder 506 that, based upon instructions received from the PCB controller 504, decodes a value received from PCB controller 504, and based on that value commands a corresponding solenoid valve driver 520 associated with a corresponding tray to open the corresponding tray for a pre-determined period of time. After the pre-determined period of time, based upon instructions received from PCB controller 504, solenoid valve decoder 506 decodes a value received from PCB controller 504 and commands the corresponding solenoid valve driver 520 to close the corresponding tray. In this example, the component receptacle 110 has ten trays and ten corresponding solenoid valve drivers 520, respectively. It should be appreciated that a wide variety of different types of automatic opening and closing mechanisms besides electromagnetic solenoid valves, such as hydraulic or pneumatic mechanisms, may be utilized.

Thus, in one embodiment, PCB controller 504 may control a tray access control system 500 to enable the controlled opening and closing of the trays 302 of the component receptacle 110. It should be appreciated that this is just one example of a tray access control system 500 and that many other variations are possible.

Additionally, as previously described, each tray has an associated manual toggle switch 355 to allow an operator, after manually selecting the toggle switch 355, to command component receptacle 110 to open and close the tray, respectively, based upon the position of toggle switch 355. This allows the operator manual access to open and close a tray. In particular, as can be seen in FIG. 5, each toggle switch 355 is directly connected to a corresponding solenoid valve driver 520 to directly control the opening and closing of the associated tray based upon the toggle switch position. Additionally, manual switch detector 525 instructs PCB controller 504 regarding the selection of the particular toggle switch and the status (open or closed position) of the particular toggle switch.

PCB controller 504 may also control the previously discussed visual indicators of the component receptacle. For example, based upon instructions received from the PCB controller 504, LED decoder 508 may decode a value from PCB controller 504 to drive a corresponding LED driver 530 for a corresponding LED visual indicator 360 for a corresponding tray.

Particularly, under the control of PCB controller 504 and LED decoder 508, a particular LED driver 530 will be powered on to drive a corresponding LED visual indicator to provide a visual indication before the associated tray is moved to the open position and to provide a visual indication before the associated tray is moved to the closed position. In this way, the operator is provided with an indication that the tray is about to be opened such that the operator can place the corresponding tested component into the open tray, and after a pre-determined period of time, a visual indication is provided that the tray is about to be closed and that the operator should have placed the component in the tray by this time or should do so immediately.

In one example, the visual indication typically includes a pre-defined number of flashes in which the LED driver 530 powers on the associated LED visual indicator 360 for a corresponding tray 302 for pre-defined intervals to create a pre-defined number of flashes providing an indication to the operator that the particular tray 302 is about to be opened or closed.

Although an LED based light indication system has been described, it should be appreciated that a wide variety of indication systems including other types of visual indication systems, as well as audio indication systems, may be utilized.

It should be appreciated that PCB controller 504 may operate under the control of a program to implement aspects of the various embodiments of the invention, previously described. It should be appreciated that components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor circuitry to perform the operations described herein. The term "data" herein refers to any type of information that is encoded for machine-readable purposes. Therefore, it may include programs, code, data, files, etc.

With the previously described structure of the component receptacle system 110, a method to test and segregate components utilizing the component receptacle will now be described.

Figure 6:
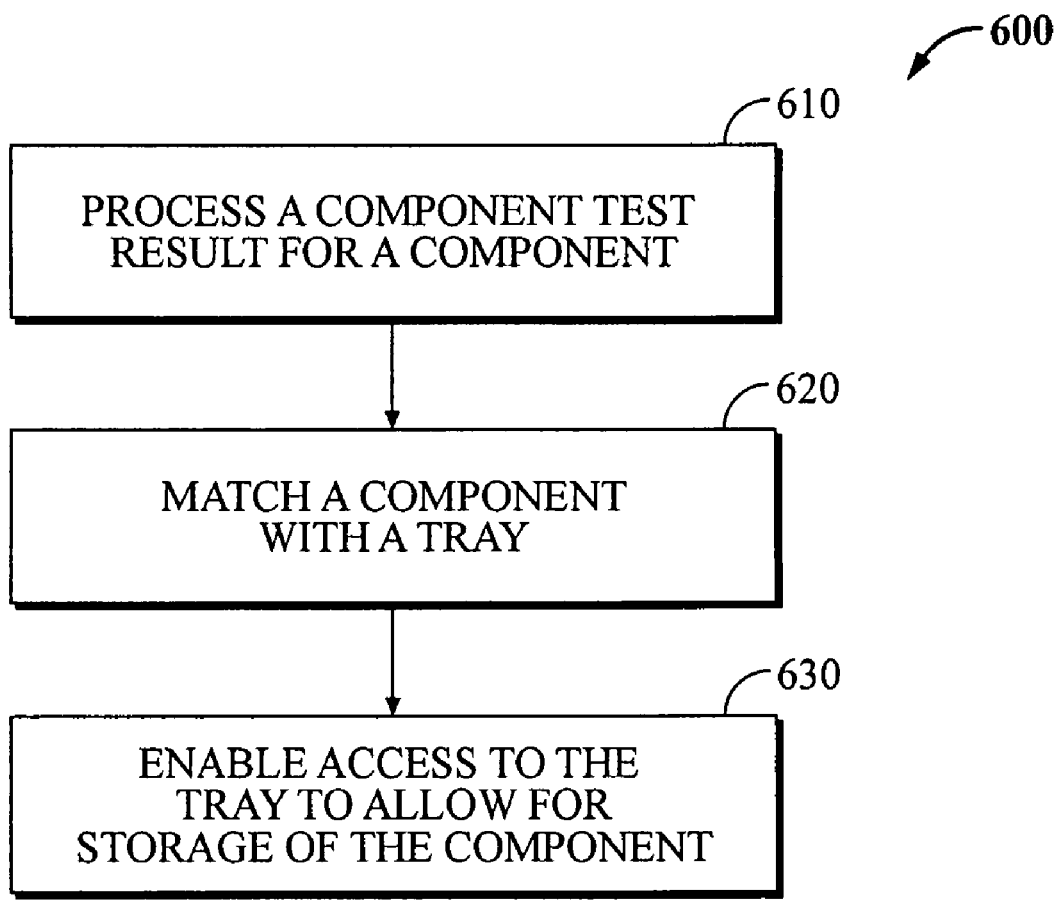
FIG. 6 is a flow diagram illustrating operations used in the manufacture of a device, according to one embodiment of the invention.

Turning now to FIG. 6, FIG. 6 is a flow diagram illustrating a method 600 used in the manufacture of a device or system, according to one embodiment of the invention. As shown in FIG. 6, at block 610, a component test result is processed for a component. At block 620, a component is matched with a corresponding tray. At block 630, access to the corresponding tray is enabled to allow for the storage of the component by an operator. It should be appreciated that these method steps to segregate components based upon test results associated with the component may be utilized in the manufacture of electrical, mechanical, and electromechanical devices and systems.

Figure 7:
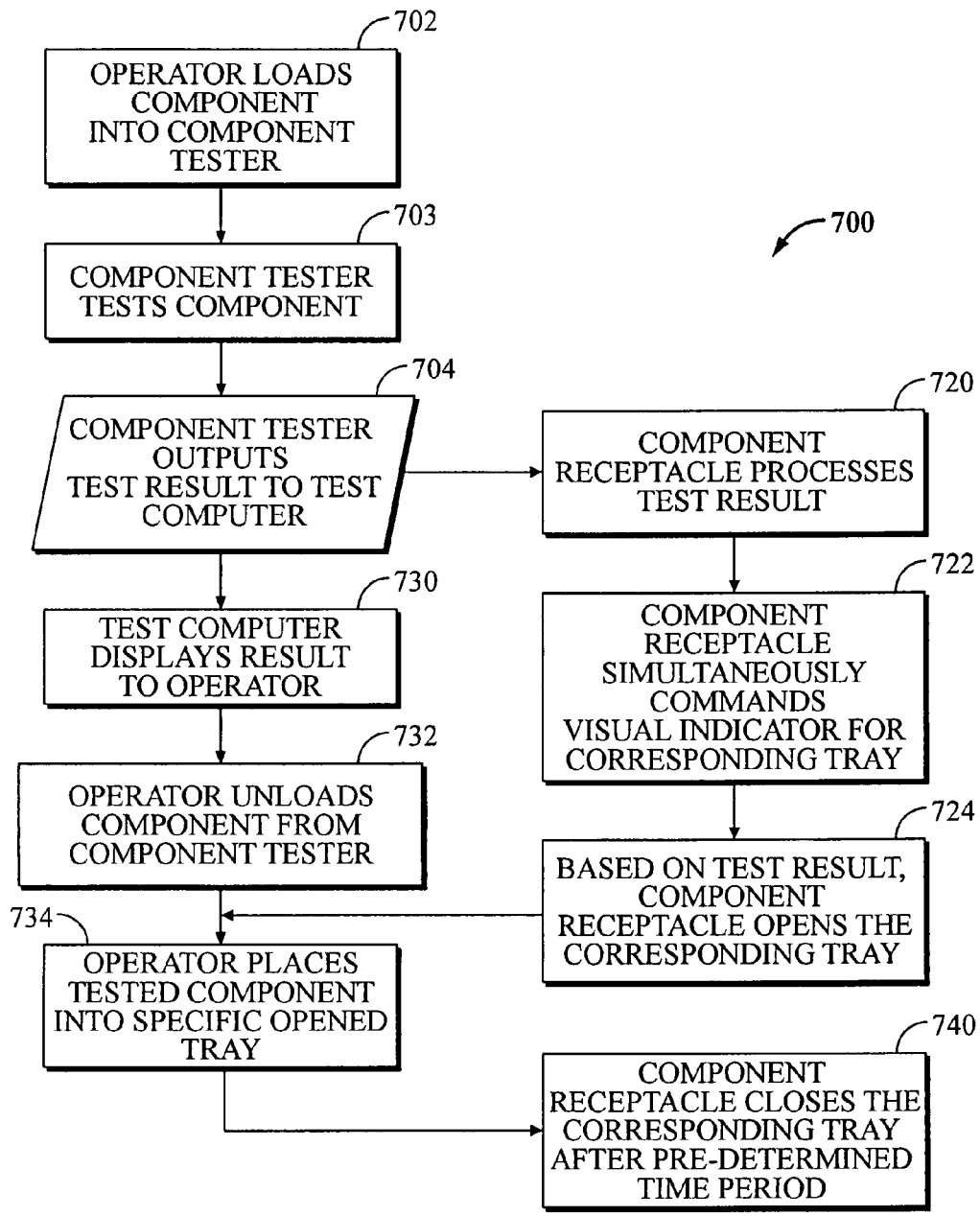
FIG. 7 is a flow diagram illustrating a method to segregate components, according to one embodiment of the present invention.

Turning now to FIG. 7, a method 700 to segregate components, according to one embodiment of the present invention, is described.

At block 702, an operator loads a component into component tester 130. The component tester 130 tests the component (block 703). The component tester 130 then outputs the test result to test computer 120 (block 704).

In one embodiment, the displayed test result may only include a simple pass/fail rating for the tested component. In other embodiments, the displayed test result may, in addition to the pass/fail rating for the component, include an indication of characteristics of the component being tested to inform the operator of the type of component (e.g., the type of electrical, mechanical, or electromechanical component and its associated characteristics) that should be under test. This allows the operator to provide a manual check that the correct types of components are being tested and are ultimately being correctly segregated together. For example, in the HGA embodiment, different HGA types based upon size, brand, and operational features (e.g. a standard HGA with longitudinal recording head or an adjustable fly-height HGA with a perpendicular recording head) may be tested.

At this point, test computer 120 may display the test results for the component to the operator (block 730), although in other embodiments it need not. For example, this test result may include the type of component tested and whether or not the component has passed or failed the test. At block 732, the operator unloads the component from component tester 130 in order to place the tested component into a specific tray 302 that is automatically opened by component receptacle 110 (block 734) as described below.

Simultaneously with these operations, component receptacle 110 processes the component test result received from test computer 120 (block 720), and based on this test result, component receptacle 110 commands a visual indicator 360 for the corresponding tray 302 to flash to indicate to the operator that the tray is opening (block 722). The component receptacle 110 then opens a specific tray 302 for the operator to store the component (block 724).

More particularly, in one embodiment, as previously described component receptacle 110, under the control of PCB controller 504, processes the component test result for the component to match the component with a particular tray 302 of the component receptacle. Component receptacle 110, under the control of the PCB controller 504, then commands tray access control system 500 to move the particularly matched tray 302 to the open position to allow the operator to store the component in the correct corresponding tray.

After the tray 302 is opened, the operator places the tested component into the specifically opened tray (block 734).

Next, component receptacle 110, under the control of the PCB controller 504, commands the corresponding tray 302 to be closed after a pre-determined time via the tray access control system 500, as previously described (block 740). In another embodiment, the corresponding tray 302 may be closed at some point after detecting insertion of the component by the operator and may have further structures to detect that the operator has withdrawn his or her hand from the corresponding tray 302 prior to closing. Additionally, component receptacle 110, under the control of the PCB controller 504, commands a visual indication through a visual indicator 360 associated with the corresponding tray 302 to alert the operator that the tray is about to close and that the operator should have by this time placed the tested component into the tray or should now immediately place the component in the tray.

In one embodiment, component receptacle 110, in order to indicate the opening of a tray, commands that all of the visual indicators 360 of the component receptacle each blink in a sequential fashion to provide a general indication that a tray 302 is about to be opened and then the specific visual indicator 360 for the corresponding tray that is about to open will flash four times before the tray is opened. In this example, the operator is given a great deal of warning that a tray 302 is about to be opened. After the tray 302 is opened, as previously described, the operator can place the tested component into the tray. In one example, the tray remains open for 20 seconds.

Continuing with this example, for the tray 302 that has been opened, at a pre-defined period of time before the tray is about to be closed, the visual indicator 360 for the corresponding tray 302 will flash seven times. By this time the operator should have placed the tested component into the tray 302 or immediately place the component in the tray before it automatically closes.

Utilizing this methodology, component receptacle 110 may significantly reduce or completely eliminate operator error in the segregation of tested components. Further, visual indicators may be used to indicate the opening of a tray to guide the operator to put the component into the correct tray.

Even further, because the component receptacle, in some embodiments, may utilize a standardized USB port, the component receptacle may be utilized with a wide variety of different types of test computers and component testers for testing a wide variety of different types of components. One example that is particularly described herein is for the testing of disk drive components such as HGAs. However, it should be appreciated that embodiments of the invention may be utilized with any type of testable electronic, mechanical, or electromechanical component.

It should be appreciated by those with skill in this art that, although embodiments of the invention have been previously described with reference to particular structural implementations such as utilizing a component receptacle with moveable trays and visual indicators coupled to a test computer and a component tester, embodiments of the invention may be utilized with a wide variety of different types of component testers and computers, and in differing types of testing environments, for a wide variety of different types of electronic, mechanical, and electromechanical components.

I claim:

1. A component receptacle for coupling to a component tester that tests components, the component receptacle comprising:
   a plurality of trays mounted in a housing for receiving components, wherein the plurality of trays are slidably mounted in the housing for movement between open and closed positions, out from and into the housing, respectively;
   a tray access control system configured to control access to at least one of the plurality of trays; and
   circuitry configured to perform operations including:
      processing a component test result for a component to match the component with the at least one tray; and
      causing the tray access control system to enable access to the at least one tray.

2. The component receptacle of claim 1, wherein processing the component test result includes determining a component characteristic.

3. The component receptacle of claim 1, wherein the component is a head gimbal assembly (HGA) component and the component test result is indicative of an HGA characteristic that includes at least one of a type of HGA and a pass/fail rating.

4. The component receptacle of claim 1, wherein the circuitry is further configured to cause the tray access control system to prevent access to the at least one tray after a period of time.

5. The component receptacle of claim 1, wherein the tray access control system is configured to move the at least one tray to the open position to enable access to the at least one tray and to move the at least one tray to the closed position to prevent access to the at least one tray.

6. The component receptacle of claim 1, wherein the tray access control system is configured to unlock the at least one tray to enable access to the at least one tray, and to lock the at least one tray to prevent access to the at least one tray.

7. The component receptacle of claim 5, further comprising a first visual indicator to provide a visual indication before the at least one tray is moved to the open position.

8. The component receptacle of claim 7, wherein the first visual indicator provides a visual indication before the at least one tray is moved to the closed position.

9. The component receptacle of claim 7, wherein a visual indicator is associated with each tray.

10. The component receptacle of claim 7, wherein the first visual indicator includes a LED device and the visual indication includes a number of flashes.

11. A method of manufacturing a device including at least one component tested at a component tester, the component tester coupled to a component receptacle having a plurality of trays for receiving components, wherein the plurality of trays are slidably mounted in the housing for movement between open and closed positions, out from and into the housing, respectively, and configured to transmit a component test result for a component to the component receptacle, the method comprising:
   processing the component test result received from the component tester for the component to match the component with at least one of the plurality of trays; and
   enabling access to the at least one tray.

12. The method of claim 11, wherein processing the component test result received from the component tester for the component includes determining a component characteristic.

13. The method of claim 11, wherein the component is a head gimbal assembly (HGA) component and the component test result is indicative of an HGA characteristic that includes at least one of a type of HGA and a pass/fail rating.

14. The method of claim 11, further comprising preventing access to the at least one tray after a period of time.

15. The method of claim 11, wherein access to the at least one tray is enabled by moving the at least one tray to the open position, and access to the at least one tray is prevented by moving the at least one tray to the closed position.

16. The method of claim 11, further comprising:
   unlocking the at least one tray to enable access to the at least one tray; and
   locking the at least one tray to prevent access to the at least one tray.

17. The method of claim 15, further comprising providing a visual indication before the at least one tray is moved to the open position.

18. The method of claim 17, further comprising providing a visual indication before the at least one tray is moved to the closed position.

19. The method of claim 17, wherein a visual indicator is associated with each tray.

20. A system to segregate components comprising:
   a component tester to test a component; and
   a component receptacle coupled to the component tester, the component receptacle including:
      a plurality of trays mounted in a housing for receiving components, wherein the plurality of trays are slidably mounted in the housing for movement between open and closed positions, out from and into the housing, respectively;
      a tray access control system configured to control access to at least one of the plurality of trays; and
      circuitry configured to perform operations including:
         processing a component test result for the component to match the component with the at least one tray; and
         causing the tray access control system to enable access to the at least one tray.

21. The system of claim 20, wherein processing the component test result includes determining a component characteristic.

22. The system of claim 20, wherein the component is a head gimbal assembly (HGA) component and the component test result is indicative of an HGA characteristic that includes at least one of a type of HGA and a pass/fail rating.

23. The system of claim 20, further comprising a test computer coupled to the component tester, and configured to process the component test result and visually display information representing the component test result on a display device.

24. The system of claim 20, wherein the circuitry is further configured to cause the tray access control system to prevent access to the at least one tray after a period of time.

25. The system of claim 20, wherein the tray access control system is configured to move the at least one tray to the open position to enable access to the at least one tray and to move the at least one tray to the closed position to prevent access to the at least one tray.

26. The system of claim 20, wherein the tray access control system is configured to unlock the at least one tray to enable access to the at least one tray, and to lock the at least one tray to prevent access to the at least one tray.

27. The system of claim 25, further comprising a first visual indicator to provide a visual indication before the at least one tray is moved to the open position.

28. The system of claim 27, wherein the first visual indicator provides a visual indication before the at least one tray is moved to the closed position.

29. The system of claim 27, wherein a visual indicator is associated with each tray.

30. The system of claim 27, wherein the first visual indicator includes a LED device and the visual indication includes a number of flashes.

\* \* \* \* \*